Patented Oct. 6, 1942

2,297,760

UNITED STATES PATENT OFFICE 2,297,760

IMIDAZOLE DERIVATIVES AND PROCESS OF MAKING SAME

Charles Graenacher, Riehen, and Jules Meyer, Basel, Switzerland, assignors to the firm Society of Chemical Industry in Basle, Basel, Switzerland No Drawing. Application January 15, 1940, Serial No. 314,009. In Switzerland January 30, 1939

16 Claims. (Cl. 260—309)

It has been found that new derivatives of heterocyclic compounds are obtained when imidazole derivatives of the general formula

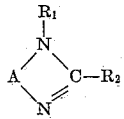

wherein A stands for an aromatic nucleus, particularly a nucleus of the benzene or naphthalene series, $R_1$ represents hydrogen or a benzyl or alkyl radical and $R_2$ represents an aliphatic hydrocarbon chain or an aliphatic carbon chain which is interrupted by an ester-like bridge, are treated with alcohols containing at least 3 carbon atoms in the presence of dehydrating agents, in particular sulphonating agents, and if, if desired, a group conferring water-soluble properties is introduced into the compound by known methods at any desired stage of the reaction.

Imidazoles of the general formula

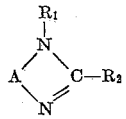

in which A, $R_1$ and $R_2$ have the meanings given above, are, for example, benzimidazoles and naphthimidazoles which are derived, for example, from ortho-phenylenediamine, or from its homologues or analogues, such as ortho-toluylenediamine or ortho- or 1:8-naphthylenediamine.

Imidazole compounds, in which $R_1$ and $R_2$ represent hydrogen in the above formula, are, for example, benzimidazole and perimidine.

Imidazoles of the general formula

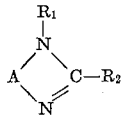

wherein A represents an aromatic nucleus, $R_1$ represents hydrogen and $R_2$ represents a substituent, are $\mu$-amino, $\mu$-mercapto, $\mu$-methoxy, $\mu$-ethoxy-, $\mu$-methyl-, $\mu$-ethyl-, $\mu$-propyl-, $\mu$-isopropyl-, $\mu$-butyl-, $\mu$-amyl-, $\mu$-heptyl-, $\mu$-undecyl-, $\mu$-pentadecyl-, $\mu$-heptadecyl-, $\mu$-heptadecenyl-benzimidazole, $\mu$-undecylperimidine; further $\mu$-oxymethylbenzimidazole, furthermore benzimidazole-2-propionic acid and its esters. Condensation products of aldehydes with imidazoles which are substituted at the $\mu$-carbon atom by a carbon chain, if desired a carbon chain interrupted by O, S or N, which contains at least 2 carbon atoms, and the $\mu$-carbon atom of which forms part of a methylene group, also come into consideration. As these examples show, $R_2$ may represent quite generally a hydrocarbon chain, if desired substituted, but particularly an aliphatic hydrocarbon chain. This chain may also be interrupted by oxygen, sulphur or nitrogen bridges, or by atomic groupings such as

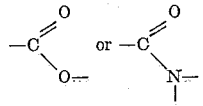

Esters of benzimidazol-2-propionic acid form examples of those products in which the aliphatic hydrocarbon chain $R_2$ is interrupted by ester-like bridges.

Imidazoles of the general formula

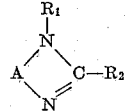

in which A represents an aromatic nucleus, $R_2$ represents hydrogen or a substituent, particularly an aliphatic hydrocarbon chain or an aliphatic hydrocarbon chain which may be interrupted by ester-like bridges are, for example, the N-alkylation and N-aralkylation products of the imidazoles named in the previous paragraph. Among them may be mentioned N-benzyl-$\mu$-heptadecyl-benzimidazole, N-dodecyl-$\mu$-propylbenzimidazole, $\mu$-heptadecylbenzimidazole-N-acetic acid ethyl ester, $\mu$-heptadecyl-N-ethylbenzimidazole. The substituent $R_1$ may quite generally represent a hydrocarbon radical, if desired substituted, the chain of which may also be interrupted by oxygen, sulphur or nitrogen bridges, or by groupings of atoms, such as

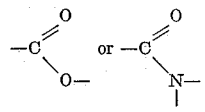

Particularly easily obtainable are those imidazoles in which $R_2$ represents an alkyl radical possessing an uneven number of carbon atoms between ten and twenty.

In the present process, in place of the imidazole compounds mentioned, their salts also may be used as parent substances, especially the salts of N-alkylated imidazoles, for example, their hydrochlorides. By the term "salts," the quaternary ammonium compounds of the imidazoles mentioned are also to be understood.

Among the alcohols possessing at least 3 carbon atoms, which come into consideration as parent substances in the present case, may be mentioned aliphatic alcohols, such as n-propyl alcohol, isopropyl alcohol, n-butyl alcohol, isobutyl alcohol, amyl alcohols, for example, amyl alcohol of fermentation; hexyl alcohol, octyl alcohol, dodecyl alcohol; further ethylene glycol monomethyl ether, diethylene glycol monobutyl ether; furthermore methyl cyclohexanol, tetrahydrofurfurol.

Dehydrating agents which are particularly suitable for use in the present process are concentrated sulphuric acid, sulphuric acid monohydrate, chlorosulphonic acid, oleum that is to say, sulphonating agents; further, phosphorous halides, such as phosphorus trichloride; furthermore anhydrous zinc chloride and the like, and finally, mixtures of the above mentioned agents.

The reaction between the imidazoles and the alcohols in the presence of dehydrating agents may take place at a low temperature; at a higher temperature, for example, at 50–55° C., the reaction proceeds essentially more rapidly. In all probability, in the present process, the splitting-off of the hydroxyl group of the alcohol and a hydrogen atom of the aromatic nucleus in the form of water takes place, when aliphatic alcohols are used, imidazole compounds which are alkylated in the aromatic nucleus may be obtained.

As a group conferring water-soluble properties, the sulphonic acid group especially may be introduced into the imidazole compound at any desired period of the reaction, that is to say, before, during or after the reaction of the alcohol with the imidazole compound has taken place. This introduction of the sulphonic acid group may be carried out in the usual manner, for example, by treatment with concentrated sulphuric acid, sulphur trioxide, chlorosulfonic acid, or sulphuric acid which contains free sulphur trioxide. It is particularly preferable that the treatment of the imidazoles with the alcohols and sulphonating agents should take place simultaneously.

Quaternary ammonium groups also come into consideration as groups conferring water-soluble properties. It is known that imidazoles and their N-alkyl derivatives may easily be transformed into quaternary ammonium compounds by treatment with alkylating agents and the like. The products of their reaction with alcohols according to the present process are also adaptable to this known process.

The reaction products obtained according to the present process, insofar as they are soluble in water and have been prepared from suitable parent materials, may find application as auxiliary products in the manufacture of textiles, for example, as wetting, scouring, washing, emulsifying, dispersing, softening, or levelling agents. Reaction products which are particularly suitable for these purposes are those products obtained from imidazole compounds which contain a high molecular aliphatic or cycloaliphatic radical connected to the $\mu$-atom or to the N-atom.

The water-soluble products of this process, particularly those which contain comparable imidazole compounds which, however, have not been prepared by reaction with an alcohol, by increased resistance towards acids or by an increased dissolving power for difficultly soluble organic sulphonic acids in acid solution.

Most of the imidazole derivatives obtainable by the process of the present invention may be represented by the general formula

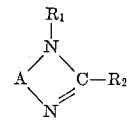

wherein A stands for a member of the group consisting of aromatic radicals of the benzene and naphthalene series containing at least one —$SO_3H$ group and at least one hydrocarbon radical with at least 3 carbon atoms, $R_1$ stands for a member of the group consisting of hydrogen, benzyl and alkyl, and $R_2$ stands for a member of the group consisting of aliphatic hydrocarbon chains and aliphatic carbon chains interrupted by an ester-like bridge, which products constitute colorless to light-colored powders which dissolve in water to form solutions having strong foaming and detergent properties. The products of the present process which are derived from benzimidazole may be represented by the formula

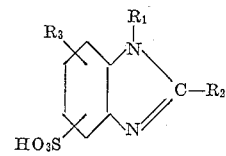

wherein $R_1$ and $R_2$ have the significance already given, and $R_3$ represents a hydrocarbon radical with at least 3 carbon atoms.

The products obtained by the present process may be used alone or in combination with other substances, such as salts, particularly salts of weak acids, for example, sodium acetate; further, together with solvents, soaps, soap-like substances, protective colloids, finishing, weighting, softening or matting agents, or the like.

The following examples illustrate the invention:

*Example 1*

50 parts by weight of $\mu$-undecylbenzimidazole are added gradually at 15–20° C. with stirring to 100 parts by weight of sulphuric acid monohydrate and, when all has dissolved, 5 parts by weight of phosphorus trichloride are added at 0–3° C. over a period of 10 minutes. The mixture is then stirred for a further half-an-hour at the same temperature. 13 parts by volume of isopropyl alcohol are then allowed to run in slowly during a period of one hour, whereupon with continued stirring, the temperature is raised during half an hour to 50–52° C. The reaction mass is stirred for a further six hours under the conditions given.

The mixture is now cooled to 10–12° C. and is sulphonated in the usual manner with sulphuric acid containing 24% $SO_3$ until a sample of the reaction mass, after neutralization with sodium carbonate, gives only a faintly opalescent solution in acetic acid.

The sulphonation mixture is now poured on to ice, and the sulphonic acid which separates is obtained by filtration.

After dispersing the acid in water and neutralizing with a solution of caustic soda, the sodium salt of the new sulphonic acid, which may probably be represented by the formula

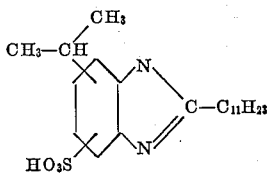

is obtained by evaporating the clear solution. It is a light-colored, crystalline powder which dissolves in water to form a strongly foaming solution of moderate stability towards acetic acid.

In a similar manner, use may be made of $\mu$-undecylperimidine, $\mu$-butyl- and $\mu$-tetradecylbenzimidazole. In place of the isopropyl alcohol, methylcyclohexanol, for example, may be used.

Example 2

50 parts by weight of N-benzyl $\mu$-heptadecylbenzimidazole hydrochloride are added gradually with stirring at 15–20° C. to 100 parts by weight of sulphuric acid monohydrate and, when all has dissolved, 5 parts by weight of phosphorus trichloride is added at 0–3° C., during a period of 10 minutes. Keeping within the same temperature range, 11 parts by volume of isopropyl alcohol are run in during a period of ¾ hour, after which the reaction mass is warmed during half-an-hour to 50–53° C. The reaction mass is maintained at this temperature for six hours with stirring.

It is now cooled to 10–12° C. and is sulphonated in the usual manner with sulphuric acid containing 24% $SO_3$ until a sample of the sulphonation mass is soluble in water. The sulphonation mixture is then poured on to ice, and the sulphonic acid, which is very probably represented by the formula

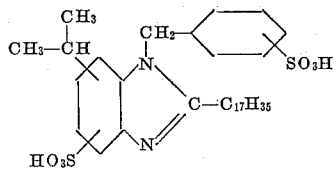

is separated by filtration and is neutralized with sodium hydroxide solution. Evaporation of the neutral solution yields a light-colored, crystalline powder, which dissolves in water to give a solution of exceptional washing power. The new product differs from an analogous sulphonate which has been prepared without pre-treatment with isopropyl alcohol by its increased dissolving power for difficultly soluble organic sulphonic acids in acid solution.

Example 3

25 parts of $\mu$-undecylbenzimidazole and 25 parts by weight of N-benzyl-$\mu$-heptadecylbenzimidazole hydrochloride are gradually dissolved in 100 parts by weight of sulphuric acid monohydrate by stirring at 15–20° C. When solution is complete, 5 parts by weight of phosphorus trichloride are added over a period of 20 minutes at 0–3° C. and with continuous stirring, and, after this, 6 parts by volume of isopropyl alcohol are gradually added at the same temperature. The reaction mass is now warmed during ¾ hour to 50–52° C. and is stirred for six hours at this temperature.

The reaction mixture is then cooled to 10–12° C. and sulphonated in the usual manner with sulphuric acid containing 24% $SO_3$ until a sample of the sulphonation mass, when neutralized with caustic soda, remains clear when heated with addition of dilute sulphuric acid. It is then poured on to ice and the mixture of sulphonic acids which separates, and which very probably contains a mixture of sulphonic acids of the formulas

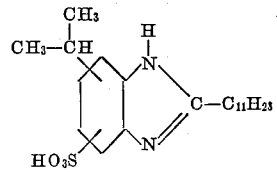

and

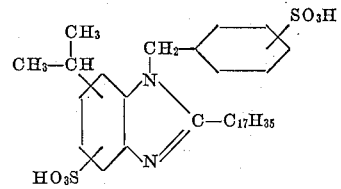

is filtered off.

By dispersing the acids in water and neutralizing with caustic soda solution, the mixture of the sodium salts of the new sulphonic acids may be obtained by evaporating the solution. They form a light-colored, crystalline powder which dissolves in water to yield a foaming solution, possessing good wetting-out powers and high washing efficiency, which remains clear on addition of dilute mineral acids.

Example 4

25 parts by weight of $\mu$-undecylbenzimidazole and 25 parts of N-benzyl-$\mu$-heptadecylbenzimidazole hydrochloride are gradually dissolved by stirring at 15–20° C. in 100 parts by weight of sulphuric acid monohydrate. With continuous stirring, 5 parts by weight of phosphorus trichloride are added at 0–3° C., and then, at the same temperature, 6 parts by volume of n-butyl alcohol are added during a period of about 15 minutes. When all has been added, the reaction mixture is heated during a period of ¾ hour to a temperature of 50–52° C. and is stirred for a further six hours at this temperature.

The mixture is then cooled to 10–12° C. and is sulphonated in the usual manner with sulphuric acid which contains 24% $SO_3$ until a sample which has been neutralized with sodium carbonate is soluble in acetic acid. The reaction mixture is now poured on to ice and the mixed sulphonic acids which separate are filtered off.

By dissolving the acids in water and neutralizing with a solution of caustic soda, the mixture of the new sulphonates may be obtained by evaporating the solution. This mixture is a light-colored, crystalline powder which dissolves in water with the formation of a solution possessing good wetting-out properties.

In place of n-butyl alcohol in the above process, isobutyl alcohol, or higher homologous alcohols such as the amyl alcohols, may be used.

Example 5

25 parts by weight of $\mu$-undecylbenzimidazole and 25 parts by weight of N-benzyl-$\mu$-heptadecylbenzimidazole hydrochloride are gradually dissolved at 15–20° C. by stirring in 100 parts by weight of sulphuric acid monohydrate. When all is completely dissolved, 25 parts by weight of sulphuric acid containing 24% $SO_3$ is added at about 4° C. with continuous stirring, and then, at the same temperature, 6 parts by volume of isopropyl alcohol are run in. The reaction mass is then warmed to 20° C. during a period of ¼ hour and is stirred at this temperature for a further eight hours. Sulphonation and further working up takes place exactly as described in Example 3.

What we claim is:

1. A process for the manufacture of imidazole derivatives, which comprises treating imidazole derivatives of the general formula

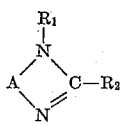

wherein A stands for a member of the group consisting of aromatic radicals of the benzene and naphthalene series, R₁ stands for a member of the group consisting of hydrogen, benzyl and alkyl and R₂ stands for a member of the group consisting of aliphatic hydrocarbon chains and aliphatic carbon chains interrupted by an

bridge with aliphatic alcohols containing 3 to 4 carbon atoms and sulphonating agents.

2. A process for the manufacture of imidazole derivatives, which comprises treating imidazole derivatives of the general formula

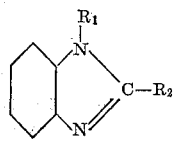

wherein R₁ stands for a member of the group consisting of hydrogen, benzyl and alkyl and R₂ stands for a member of the group consisting of aliphatic hydrocarbon chains and aliphatic carbon chains interrupted by an

bridge, with aliphatic alcohols containing 3 to 4 carbon atoms and sulphonating agents.

3. A process for the manufacture of imidazole derivatives, which comprises treating imidazole derivatives of the general formula

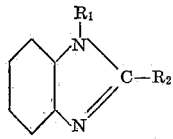

wherein R₁ stands for a member of the group consisting of hydrogen, benzyl and alkyl and R₂ stands for an alkyl containing more than 10 carbon atoms, with aliphatic alcohols containing 3 to 4 carbon atoms and sulphonating agents.

4. A process for the manufacture of imidazole derivatives, which comprises treating imidazole derivatives of the general formula

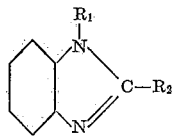

wherein R₁ stands for a member of the group consisting of hydrogen, benzyl and alkyl and R₂ stands for an alkyl containing an odd number of carbon atoms between 10 and 20, with aliphatic alcohols containing 3 to 4 carbon atoms and sulphonating agents.

5. A process for the manufacture of imidazole derivatives, which comprises treating imidazole derivatives of the general formula

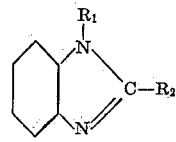

wherein R₁ stands for a member of the group consisting of hydrogen, benzyl and alkyl and R₂ stands for an alkyl containing an odd number of carbon atoms between 10 and 20, with an isopropyl alcohol and sulphonating agents.

6. A process for the manufacture of imidazole derivatives, which comprises treating imidazole derivatives of the formula

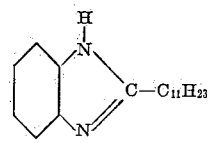

with isopropyl alcohol and sulphonating agents.

7. A process for the manufacture of imidazole derivatives, which comprises treating imidazole derivatives of the formula

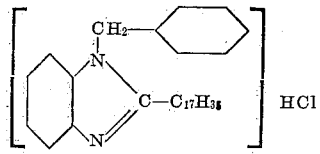

with isopropyl alcohol and sulphonating agents.

8. A process for the manufacture of imidazole derivatives, which comprises treating a mixture of imidazoles of the formulas

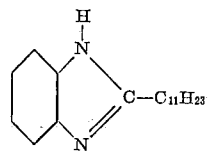

and

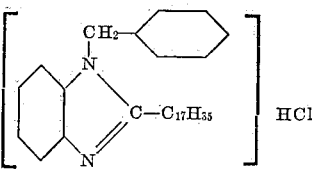

with isopropyl alcohol and sulphonating agents.

9. The salts of the compounds identical with those which are obtained by the process which comprises treating imidazole derivatives of the general formula

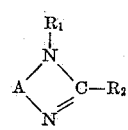

wherein A stands for a member of the group consisting of aromatic radicals of the benzene and naphthalene series, R₁ stands for a member of the group consisting of hydrogen, benzyl and alkyl and R₂ stands for a member of the group consisting of aliphatic hydrocarbon chains and aliphatic carbon chains interrupted by an

bridge with aliphatic alcohols containing 3 to 4 carbon atoms and sulphonating agents.

10. The salts of the compounds identical with those which are obtained by the process which comprises treating imidazole derivatives of the general formula

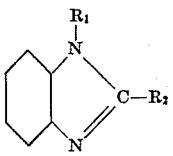

wherein $R_1$ stands for a member of the group consisting of hydrogen, benzyl and alkyl and $R_2$ stands for a member of the group consisting of aliphatic hydrocarbon chains and aliphatic carbon chains interrupted by an

bridge, with aliphatic alcohols containing 3 to 4 carbon atoms and sulphonating agents.

11. The salts of the compounds identical with those which are obtained by the process which comprises treating imidazole derivatives of the general formula

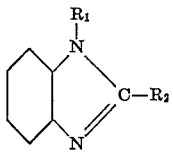

wherein $R_1$ stands for a member of the group consisting of hydrogen, benzyl and alkyl and $R_2$ stands for an alkyl containing more than 10 carbon atoms, with aliphatic alcohols containing 3 to 4 carbon atoms and sulphonating agents.

12. The salts of the compounds identical with those which are obtained by the process which comprises treating imidazole derivatives of the general formula

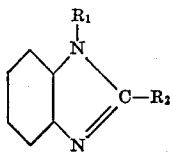

wherein $R_1$ stands for a member of the group consisting of hydrogen, benzyl and alkyl and $R_2$ stands for an alkyl containing an odd number of carbon atoms between 10 and 20, with aliphatic alcohols containing 3 to 4 carbon atoms and sulphonating agents.

13. The salts of the compounds identical with those which are obtained by the process which comprises treating imidazole derivatives of the general formula

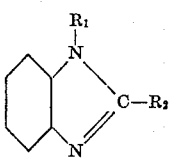

wherein $R_1$ stands for a member of the group consisting of hydrogen, benzyl and alkyl and $R_2$ stands for an alkyl containing an odd number of carbon atoms between 10 and 20, with an isopropyl alcohol and sulphonating agents.

14. The salts of the compounds identical with those which are obtained by the process which comprises treating imidazole derivatives of the formula

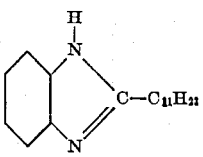

with isopropyl alcohol and sulphonating agents.

15. The salts of the compounds identical with those which are obtained by the process which comprises treating imidazole derivatives of the formula

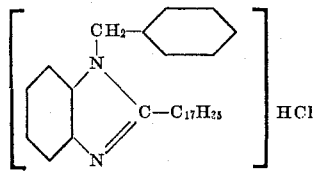

with isopropyl alcohol and sulphonating agents.

16. The salts of the compounds identical with those which are obtained by the process which comprises treating a mixture of imidazoles of the formulas

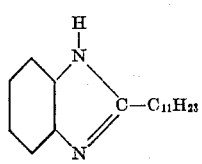

and

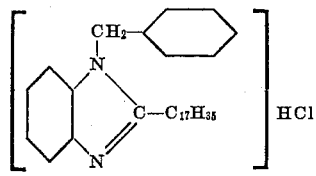

with isopropyl alcohol and sulphonating agents.

CHARLES GRAENACHER.
JULES MEYER.